E. J. CUNNINGHAM.
PULLEY.
APPLICATION FILED MAR. 23, 1909.
963,998.
Patented July 12, 1910.
2 SHEETS—SHEET 1.
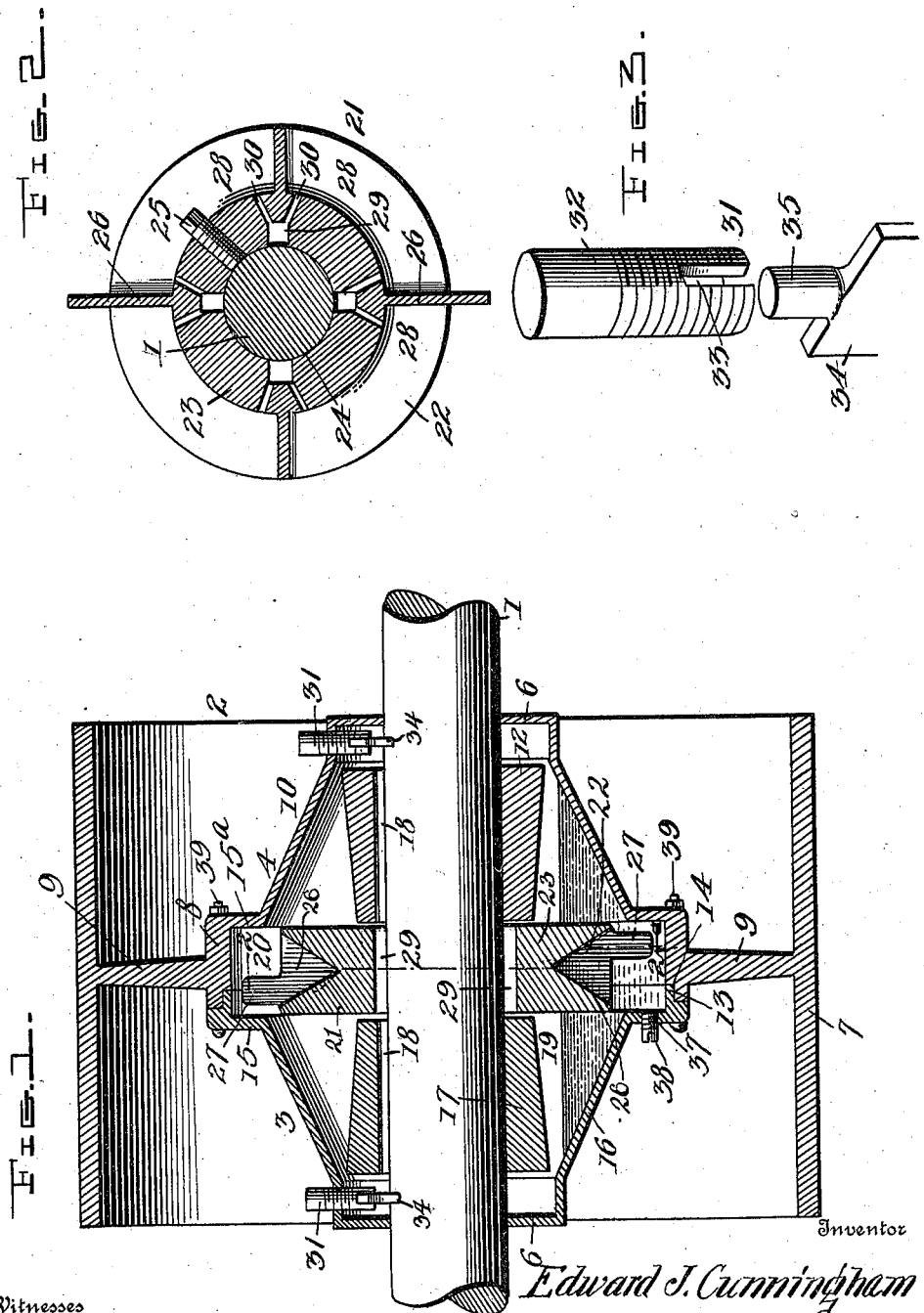
Inventor
Edward J. Cunningham
By Victor J. Evans
Attorney
Witnesses

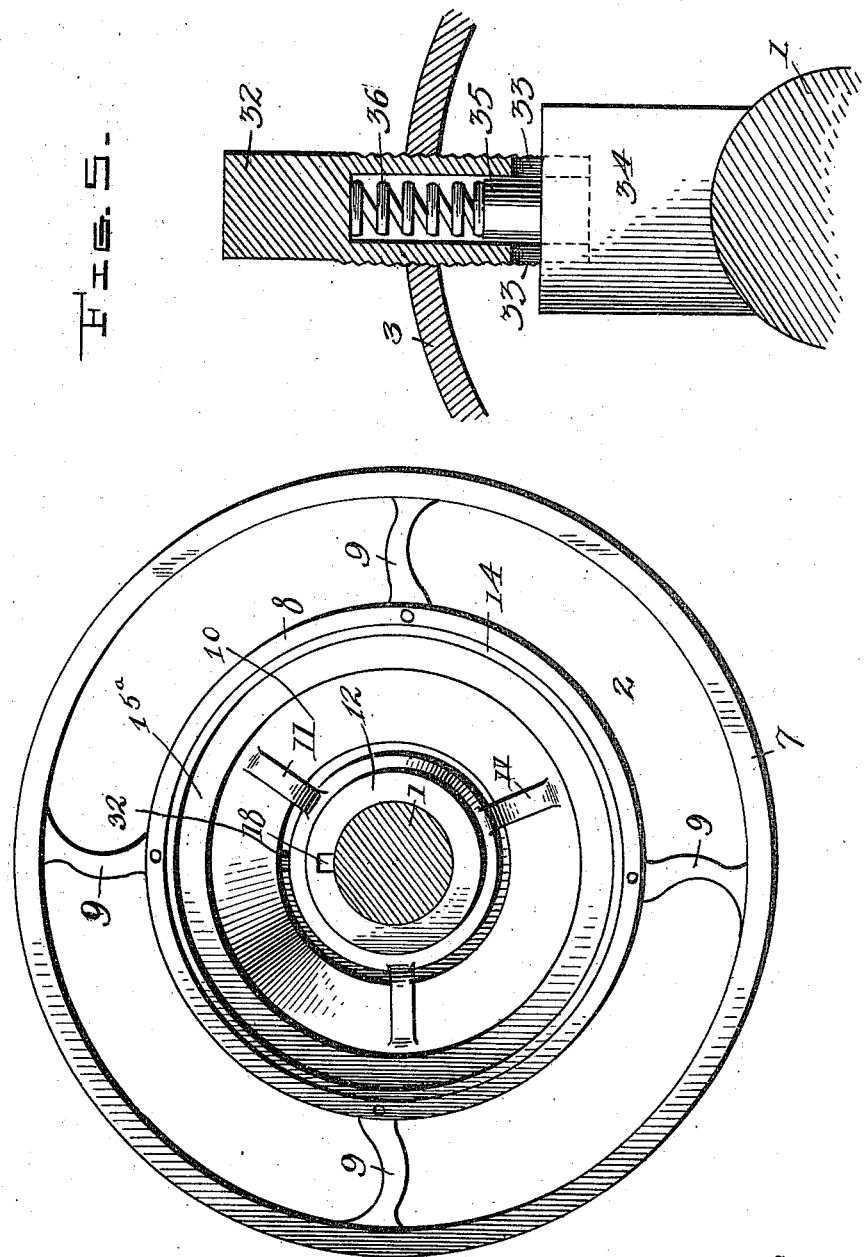

UNITED STATES PATENT OFFICE.

EDWARD J. CUNNINGHAM, OF CANTON, MASSACHUSETTS.

PULLEY.

963,998.   Specification of Letters Patent.   Patented July 12, 1910.

Application filed March 23, 1909. Serial No. 485,301.

*To all whom it may concern:*

Be it known that I, EDWARD J. CUNNINGHAM, a citizen of the United States, residing at Canton, in the county of Norfolk and State of Massachusetts, have invented new and useful Improvements in Pulleys, of which the following is a specification.

This invention relates to the class of journal boxes, pulleys and shafting, and more particularly to the subclass of loose pulleys and lubricators therefor, and has for an object to provide a pulley arranged to contain a quantity of oil or other lubricant, and to provide a novel form of collector adapted to collect oil and to convey it to the shaft upon which the pulley is mounted.

A further object of my invention is to provide a pulley comprising sectional elements provided with hubs to be mounted upon a shaft, and to provide the sectional elements with means so that when oil flows beyond the outer extremities of the hubs it will by centrifugal force be carried outwardly toward the vertical axis of the pulley to be again deposited into the collector and afterward conveyed to the shaft.

Other objects and advantages will be apparent as the nature of the invention is better set forth, and it will be understood that changes within the scope of the claim may be resorted to without departing from the spirit of the invention.

In the drawings, forming a portion of this specification and in which like numerals of reference indicate similar parts in the several views:—Figure 1 is a vertical section through the pulley. Fig. 2 is a detail section taken on the line 2—2 of Fig. 1. Fig. 3 is a fragmentary perspective view of one of the oil wipers. Fig. 4 is a side elevation of one of the pulley elements. Fig. 5 is a detail section taken through one of the oil wipers.

Referring now more particularly to the drawings, there is shown a shaft 1 of the usual construction upon which my improved pulley 2 is loosely mounted, and as shown, the said pulley comprises elements 3 and 4 each having its outer end closed by a head 6. The element 2 is provided with the usual annular belt flange 7, and the said section is provided with a centrally located annular flange 8 connected to the flange 7 by means of spokes 9. The flange 8 is connected to the head 6 of its element by means of a hollow conical portion 10, and secured by means of arms or spokes 11 to the portion 10 is a hub 12 which is preferably tapered from its outer toward its inner end as clearly illustrated in Fig. 1 of the drawings. The element 3 is provided with an annular flange 13 arranged for interlocking engagement with an annular rabbeted portion 14 formed in the flange 8 of the element 4. The element 3 is provided with a flat annular portion 15 disposed in parallel relation to a similar portion 15$^a$ of the element 4. The head 6 of the element 3 is connected to the flat annular portion 15 by means of a conical or tapered portion 16 of hollow form and preferably identical in construction to the portion 10 of the element 4. The element 3 is provided with a hub 17 similar to the hub 12, and as shown, these hubs are spaced at their inner ends from each other and are provided with alining grooves 18. It will be clearly seen upon reference to Fig. 1 of the drawings that the outer ends of the hubs are spaced from the heads 6 and the purpose of this construction will be hereinafter more fully explained. The construction just described is such that the hub is provided with an oil or lubricant chamber 19 which communicates with an annular chamber 20.

An oil or lubricant collecting element or member is shown at 21 which is preferably constructed in the form of a sleeve or wheel having an annular V-shaped groove 22. The hub portion 23 of the collector is provided with a shaft receiving passage 24, and to securely hold the collector in an operative position upon the shaft 1, I provide the hub portion 23 with an adjusting screw 25 adapted to be engaged with the shaft 1 as is obvious.

The construction of the collector is such that it is disposed in the chamber 20 formed by the elements 3 and 4 of the pulley. The hub portion 23 of the collector has extending therefrom a plurality of radial wings 26, each of said wings being provided with an outwardly extending elongated finger 27. By providing the collector with the radial wings 26 it is obvious that I provide a plurality of pockets 28 which are separated from each other. In constructing the collector I arrange the fingers 27 out of line with each other. The hub portion 23 of the collector is provided with longitudinally extending grooves 29 that communicate with passages 30 formed in the hub portion and which open at their outer ends into the groove 22. As shown, I preferably provide the hub 23 with a pair of such passages 30 for each wing 26 and arrange them so that one lies adjacent to each side of the wing.

The elements 3 and 4 are each provided with an oil wiper 31 comprising a hollow exteriorly threaded screw 32 having alining slots 33 in which a member 34 is slidably mounted which latter is preferably formed from Babbitt metal. The wipers are operatively engaged with the elements 3 and 4 before said elements are secured together. The member 34 is provided with a cylindrical stud 35 disposed in the hollow portion of the screw 32 and engaged by a helical expansion spring 36 adapted to normally hold the member 34 yieldingly engaged with the shaft 1.

When the pulley revolves, the shaft and collector are stationary or nearly so, and the object of numerous radial wings is that one at least will remain upright or nearly so, so that oil coming in contact with same will flow down by gravity to the shaft. In view of the fact that the grooves or passages 18 are located longitudinally of the shaft 1, oil or lubricant discharged into the passages 29 will be free to flow into the grooves or passages 18 to thoroughly lubricate all frictional points of contact between the shaft and the pulley thus allowing a perfect operation of the latter. Should oil from the shaft 1 flow to a point beyond the outer ends of the hubs 12 and 17, the oil will be carried by centrifugal force toward the portions 10 and 16 of the elements 4 and 3 and carried forwardly to be discharged into the chamber 20, whereupon, the oil is free to be deposited into the groove 22 to be again discharged to the shaft 1. By providing the wipers 31 at the ends of the pulley it is obvious that the oil will not pass beyond the heads 6 but will be confined upon the shaft 1 between the wipers. I preferably provide the portion 15 of the element 3 with a filling opening 37 normally closed by a removable plug 38. The elements 3 and 4 can be secured to each other in any desired manner but I preferably employ transversely disposed clamping bolts 39 as shown in Fig. 1 of the drawings.

I claim:

A loose pulley for shafts comprising companion members having closed head portions apertured for the reception of the shaft, said members having centrally located chamber-forming portions, hubs supported by the members and apertured for the reception of the shaft, said hubs having longitudinally extending channels formed therein and opening directly onto the shaft, an oil collector fixed to the shaft and disposed between the inner ends of the said hubs, said collector having a grooved peripheral portion and having a series of channels which open at their inner ends into the channels in said hubs and opening at their outer ends into the said peripheral groove of the collector, wings extending between the walls of the annular groove of said collector, and fingers extending from the wings and arranged radially of the shaft and alternately alining with each other and extending directly into the said central chamber.

In testimony whereof I affix my signature in presence of two witnesses.

EDWARD J. CUNNINGHAM.

Witnesses:
WILLIAM CUNNINGHAM,
GEO. M. YOUNG.